(12) United States Patent
Haka

(10) Patent No.: US 6,387,009 B1
(45) Date of Patent: May 14, 2002

(54) TRACTION DRIVE WITH SLIP CONTROL AND METHOD OF CONTROLLING THE SLIP

(75) Inventor: Raymond James Haka, Brighton, MI (US)

(73) Assignee: General Motors Corporation, Detroit, MI (US)

(*) Notice: Subject to any disclaimer, the term of this patent is extended or adjusted under 35 U.S.C. 154(b) by 0 days.

(21) Appl. No.: 09/442,319

(22) Filed: Nov. 22, 1999

(51) Int. Cl.$^7$ .......................... F16H 13/12; F16H 61/31
(52) U.S. Cl. .................. 476/11; 476/4; 476/40
(58) Field of Search ............... 476/1, 2, 3, 4, 476/9, 10, 40, 11

(56) References Cited

U.S. PATENT DOCUMENTS 3,596,467 A * 8/1971 Avery ..................... 60/39.28
6,162,144 A * 12/2000 Haka ..................... 476/10

* cited by examiner

*Primary Examiner*—David Fenstermacher
(74) *Attorney, Agent, or Firm*—Leslie C. Hodges

(57) ABSTRACT

A traction drive transmits power between an input shaft and an output shaft through a friction drive that includes an input disc, an output disc and a plurality of traction rollers. A slip speed occurs between the discs and the traction rollers which is maintained within a predetermined range which is limited by the coefficient of traction of the fluid on the surface of the discs and rollers. The angle of the rollers relative to the discs is recorded and the offset of the rollers relative to the one to one ratio is calculated from data including the speeds of the input and output discs and the traction rollers. The determination of the offset is made at a zero torque transmission condition. This offset is used to determine the appropriate normal force to be applied to the discs and roller interface to maintain the slip speed in the predetermined range when torque is being transmitted.

6 Claims, 2 Drawing Sheets

TRACTION DRIVE WITH SLIP CONTROL AND METHOD OF CONTROLLING THE SLIP

TECHNICAL FIELD

This invention relates to traction drive transmissions having a slip control and control method to limit the slip between members of the traction drive.

BACKGROUND OF THE INVENTION

Infinitely variable transmissions generally employ a continuously variable unit (CVU) and a gearing unit. The gearing unit has a summing differential that combines the engine input power to the transmission with the output power of the CVU for delivery to an output shaft of the transmission. The gearing will commonly permit a geared neutral wherein the output shaft is stationary while both the input and output of the CVU are rotating. The CVU includes a traction drive assembly commonly in the form of a full toroidal type unit or a half toroidal type unit. Both of these devices transmit power from an input disc to an output disc via transfer rollers through a traction force. The CVU generally includes two input discs, two output discs and a plurality of transfer rollers disposed between respective input disc/output disc pairs.

The traction force is carried through an oil film between the discs and the transfer rollers. During the transmission of torque between the discs, a slip occurs at the interface of the discs and the rollers. When the relation between the traction force and the slip characteristic is evaluated, it appears to be similar to a viscous shear force. The traction force is proportional to the normal force between the discs and the rollers. The normal force can be imposed through a hydraulically actuated piston attached to one of the input discs while the other input discs is grounded.

The transfer rollers are rotatably supported on trunnions that have a hydraulic force applied thereto to maintain the transfer rollers in the desired position between the respective pairs of input and output discs. The hydraulic force applied to the trunnions establishes the traction force between the discs and the rollers. The traction force divided by the normal force represents the coefficient of traction. The maximum torque capacity of the CVU is determined by the geometry of the discs and rollers, the normal force and the coefficient of traction of the fluid which varies with temperature. If the torque being transmitted exceeds the maximum torque capacity, detrimental slippage will occur between the discs and the rollers which can damage the CVU.

One system for controlling the normal force and traction force is shown in U.S. Ser. No. 09/323,259 filed Jun. 1, 1999 and assigned to the assignee of this application. Another control system for a toric type drive is described in U.S. Pat. No. 5,067,372 issued on Mar. 4, 1997.

SUMMARY OF THE INVENTION

It is an object of the present invention to provide an improved traction drive and control having a method of determining the slip speed.

In one aspect of the present invention, sensors are placed to record the input disc speed, the output disc speed, the traction roller speed and the traction roller angle. In another aspect of the present invention, the speed of the discs and rollers and the roller angle is recorded when the torque transmission is approximately equal to zero.

The maximum coefficient of traction varies with fluid temperature and the speed ratio of the CVU. The speed ratio of the CVU is a function of the angle at which the traction rollers are positioned. This angle is varied to vary the speed ratio. Speed sensors are positioned to determine the input disc speed, the output disc speed and the traction roller speed. These sensors are relatively inexpensive and provide accurate and repeatable data. An angle sensor is provided to determine the operating angle of the traction rollers. It is difficult with the sensors presently available to accurately determine the roller angle unless an inordinately expensive sensor is employed. However, the presently inexpensive angle sensors do provide acceptable repeatability. With the present invention the exact angle need not be known as long as the data can be repeated. In other words, if the sensor indicates the data is being taken at the proper angle, the exact value is not required.

The data is collected when the CVU is transmitting approximately zero torque. At this operating condition, the slip between the discs and the traction rollers is zero. This establishes a baseline for that angle of the traction rollers. The system repeats the reading at the data point when the torque is zero and updates a table of values for the various angles. When torque is being transmitted, the control system can determine the slip between the rollers and the discs from the stored data and adjust the normal force, if required, to maintain the slip speed within a desired range near the maximum coefficient of traction permitted by the traction fluid.

DESCRIPTION OF AN EXEMPLARY EMBODIMENT

Figure 1:
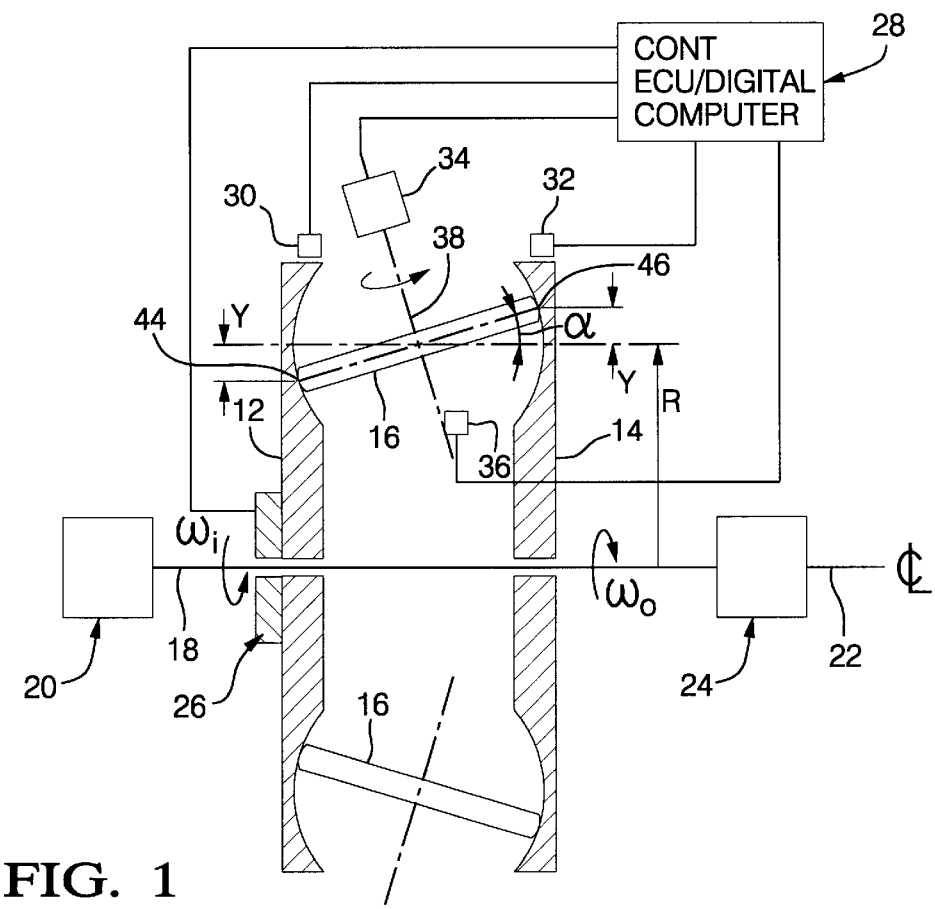
FIG. 1 is a schematic representation of a traction drive having an input disc, an output disc and a traction roller.

The schematic representation of a continuously variable unit (CVU) 10, shown in FIG. 1, has an input disc 12, an output disc 14 and a plurality of traction rollers 16. The input disc 12 is driven by an input shaft 18 which is connected with a conventional internal combustion engine 20. The output disc 14 is drivingly connected with an output shaft 22 through a conventional summing differential 24 which is also drivingly connected with the input shaft 18.

Those skilled in the art will recognize that the CVU can be comprised of two input discs, spaced on opposite sides of two output discs, with traction rollers between respective input/output pairs of discs. A conventional hydraulic piston and cylinder 26 urges the input disc 12 toward the output disc 14 to apply a normal force between the discs 12 and 14 and the traction rollers 16. Hydraulic fluid is supplied to the piston and cylinder 26 from an electro-hydraulic control 28. The control 28 includes a hydraulic pressure source and an electronic control unit including a programmable digital computer. The control may be constructed in accordance with the control described in the patent application of U.S. Ser. No. 09/323,259 filed Jun. 1, 1999 and assigned to the assignee of this application; and which patent application is incorporated herein by reference. It will be noted that the CVU described in the above mentioned patent application. includes two input discs and two output discs. This construction, as previously mentioned, can also be utilized with the present invention.

Conventional speed sensors 30, 32, and 34 are disposed adjacent the input disc 12, the output disc 14 and the traction rollers 16 respectively to measure the rotary speed of these members. The speed measurements are transmitted to the control 28 for use by the digital computer. A conventional angle detector or sensor 36 is disposed adjacent an axle 38 on which one of the rollers 16 is mounted. The data sensed at the sensor 36 is also transmitted to the digital computer. The present invention does not require that the angle sensor provide an accurate angular disposition. What is important with the present invention is the repeatability of the sensor.

Figure 2:
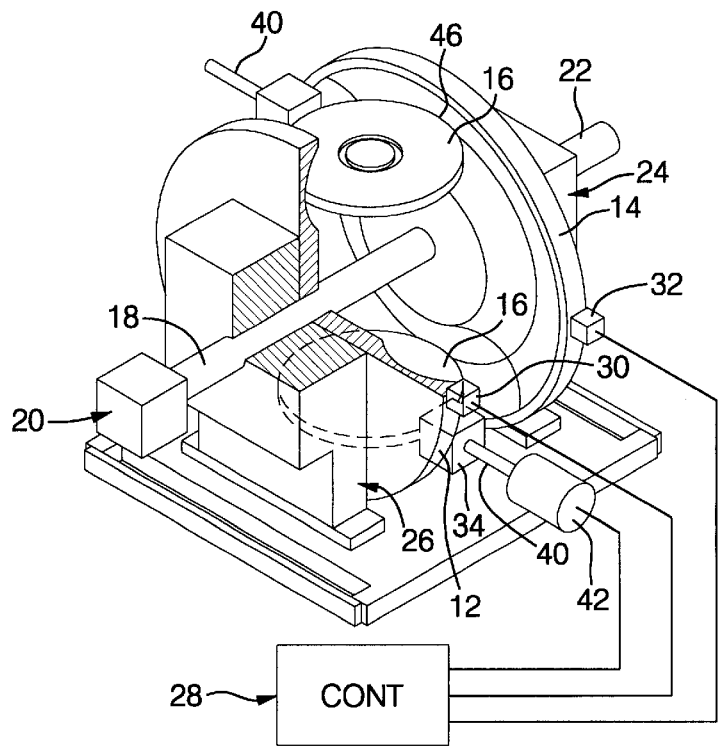
FIG. 2 is a diagrammatic isometric view of a traction drive.

The diagrammatic CVU 10 shown in FIG. 2 depicts a trunnion control rod 40 which is positionable by a hydraulic power cylinder 42 that is in fluid communication with the control 28. The effective hydraulic pressure in the cylinder 42 is proportional to the torque being transmitted between the input disc 12 and the output disc 14. When the effective pressure in the cylinder 42 is zero, the torque being transmitted is zero. The CVU 10 operates in a zero torque mode often during the operation of the vehicle, not shown, such as during coasting without engine braking.

When the CVU 10 is transmitting torque from the input shaft 18 to the output shaft 22, a slip will occur between the input disc 12 and the traction rollers 16 and between the traction rollers 16 and the output disc 14. To provide the most efficient operation of the CVU 10, it is desirable to maintain the slip at a value slightly below the slip value supported at the maximum coefficient of traction. This is accomplished by maintaining the proper normal force to traction force relationship. In CVU control schemes, such as that discussed in U.S. Ser. No. 09/323,259, the traction force and normal force are proportional to the pressure acting on the power cylinder 42 and the piston and cylinder 26. If the slip speed becomes excessive, damage to the CVU 10 can result. The coefficient of traction varies with the fluid temperature and the speed ratio. The speed ratio varies with the angle of the traction rollers 16. In order to provide the proper traction and normal forces, the angular position of the traction rollers 16 should be determined. However, as previously mentioned, the angle sensors presently available are either very expensive or do not accurately read the angle. The sensors which do not accurately read the angle can be made to consistently read the same angle. Thus while the angle data may not be accurate in absolute valve, the data is repeatable at the measured angle.

The present invention takes advantage of the repeatability of the sensor by recording and storing the data taken. Thus as long as the angle sensor provides consistent data at an angle the digital computer can determine which position in a look-up table the data is to be stored. With the addition of the traction roller speed sensor 34 and the roller angle sensor 36, it is possible to observe the fraction of slip at each contact patch 44 between the input disc 12 and the traction roller 16 and at the contact patch 46 between the traction roller 16 and the output disc 14.

The data taken by the speed sensors 30, 32 and 34 will provide the velocity of the various components in accordance with the following equations:

1). $Vi=(R-Y)*Wi$
2). $Vr=Rr*Wr$
3). $Vo=(R+Y)*Wo$ where: Vi is the velocity of the disc 12 at the contact patch 44
Vr is the velocity of the traction roller 16
Vo is the velocity of the disc 14 at the contact patch 46
R is the radius at the center of the torus of the discs 12 and 14
Rr is the radius of the roller 16
$Y=R*\sin \alpha$ and is the radial offset of the contact patches 44, 46
$\alpha$ is the angle of the roller.

Slip can be defined as follows:

4). $Vr=(1-Sa)*Vi$
5). $Vo=(1-Sb)*Vr$ where Sa is the fraction of velocity lost at the contact patch 44
Sb is the fraction of velocity lost at the contact patch 46
St is the fraction of the velocity lost at both contact patches.

By combining equations 1, 2 and 4
6). $(1-Sa)=((R-Y)*Wi)/(Rr*Wr)$.
By combining equations 2, 3 and 5
7). $(1-Sb)=((R-Y)*Wo)/(Rr*Wr)$
By combining equations 4 and 5
8). $Vo=(1-Sb)*(1-Sa)*Vi$
Total slip St can be defined as
9). $(1-St)=((R+Y)*Wo)/(Wi*(R-Y))$ The theoretical speed ratio equals $(R+Y)/(R-Y)$. The actual speed ratio equals Wo/Wi. These values will be equal when substantially zero torque is being transmitted. In the first and third quadrants, the value of Y is positive; in the second and fourth quadrants, the value of Y is negative. Thus for underdrive ratios, the theoretical speed ratio will be less than 1.0; and for overdrive ratios, the theoretical speed ratio will be greater than 1.0.

When zero torque is being transmitted, the equations 6, 7 and 9 will be equal to unity (1). Since the slip speeds at the patches 44 and 46 will be zero at zero torque regardless of the roller angle, the Y value can be calculated from the equations 6 and 7 or from equation 9. This permits the system to be self calibrating and the absolute accuracy of the angle sensor is immaterial as long as the sensor will repeat the data reading for each specific position. This will permit the calculation of a Y value for each incremental angular value in the system. The Y, $\alpha$ and speed ratio values can be stored in the look-up table to be used when the CVU is transmitting torque.

If it is found to be acceptable to control the system based on total slip, then equation 9 will provide the solution for the value Y. Each specific "Y" value has a related angle $\alpha$ of the roller 16. Knowing the value Y will permit the control to establish the proper control pressures in the system to maintain the slip within the proscribed range to prevent damage to the CVU 10. The advantage of equation 9 is that the speed sensor 34 at the traction roller 16 is not required. If the control scheme requires more accurate data, the equations 6 and 7 can be solved to determine if either patch 44 or 46 is approaching excessive slip and correct the pressure in the system accordingly.

The Y values, which are recorded in look-up tables in the digital computer at zero torque conditions, are continually updated during vehicle operation to provide an adaptive control. This will permit changes in the system to be accommodated as well as provide flexibility for individual systems. The system extracts the zero torque data from the look-up tables to determine the amount of slip that is occurring at the contact patches 44 and 46 when the CVU 10 is transmitting torque. The control 28 then distributes pressure adjustments that are necessary to maintain the slip speed within the desired range.

Figure 3:
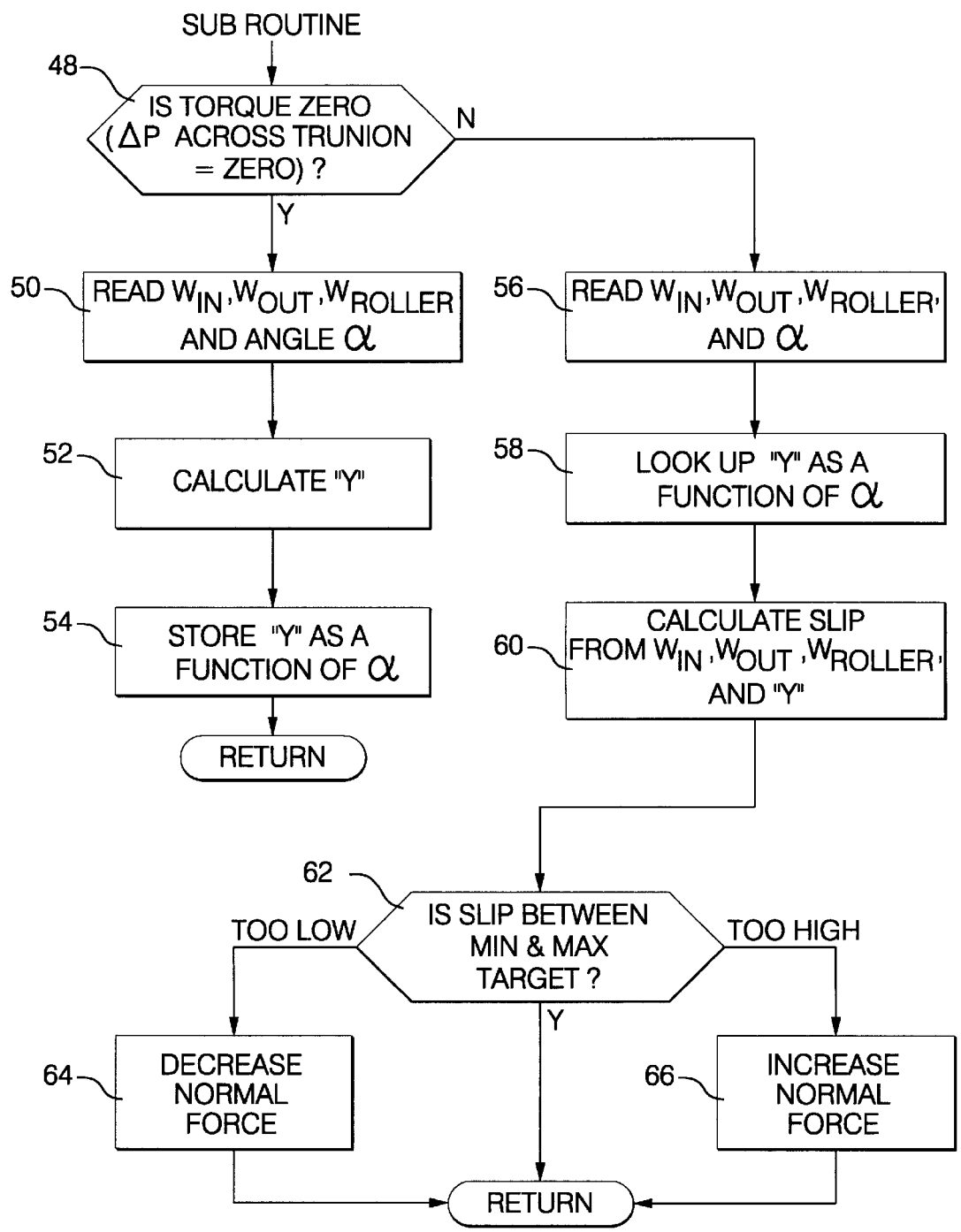
FIG. 3 is an algorithm describing a method of controlling a CVU in accordance with the present invention.

The algorithm depicted in FIG. 3 is a subroutine that can be used with the digital computer of the control 28. At step 48 the algorithm determines the torque being transmitted by the CVU 10 and, if the torque is zero, passes the algorithm to step 50; where the data relating to speed and angular position of the rollers 16 is read. The algorithm then calculates the value of offset Y at step 52 and stores this value in a look-up table, not shown, as a function of the angular position of the rollers 16 at step 54. The subroutine is then returned to the main program of the computer, not shown.

If the torque being transmitted by the CVU 10 is not zero, the algorithm passes to the step 56 where the data relating to speed and angular position of the rollers 16 is read and passed to step 58. The algorithm refers to the look-up table to determine the value of offset Y as a function of the angular position of the rollers 16. The algorithm, at step 60, then calculates the slip across the CVU 10 and passes this data to step 62 where the algorithm determines if the slip is within a desired range. If the slip is within the desired range, the algorithm returns to the main program.

If the slip is lower than the desired range at step 62, the algorithm issues a command to decrease the normal force on the input disc 12 and then returns to the main program. If at step 62 the slip is higher than the expected range, the algorithm issues a command to increase the normal force on the input disc 12 at step 66 and then returns to the main program.

What is claimed is:

1. A continuously variable transmission and control comprising:
   an input member having speed sensing means for determining the speed thereof;
   an output member having speed sensing means for determining the speed thereof;
   a plurality of traction members frictionally engaging said input member and said output member and being angularly adjustable therebetween to provide speed ratios therebetween;
   angle sensing means for determining the angular position of said traction members;
   means for determining a corresponding offset value for said traction members using at least said input speed and said output speed when said input member and said output member are rotating at substantially zero torque transmission;
   means for recording said angular position, and said corresponding offset value.

2. The continuously variable transmission and control defined in claim 1 further comprising:
   at least one of said traction members having speed sensing means for sensing the rotary speed thereof; and
   means for determining a speed differential between said input member and said one traction member, and between said one traction member and said output member.

3. A method of controlling the normal force in a CVU of continuously variable traction drive comprising the steps of:
   a). determining the torque being transmitted by the CVU;
   b). if the torque is substantially zero, reading data values of at least input speed, output speed and roller angle;
   c). calculate an offset value from the data values of step b).; and
   d). store the offset value as a function of the roller angle.

4. The method of controlling the normal force in a CVU of continuously variable traction drive defined in claim 3 further comprising the steps of:
   e). if the torque being transmitted is not zero, reading at least the data values for input speed, output speed and roller angle;
   f). retrieve the stored offset value as a function of the roller angle read in step e).;
   g). calculate the slip from at least the input speed and output speed read in step e).;
   h). determine if the calculated slip is within a predetermined range;
   j). if the calculated slip is outside the predetermined range, issue a command to adjust a normal force in the CVU to adjust the slip toward the predetermined range.

5. The method of controlling the normal force in a CVU of continuously variable traction drive defined in claim 3 further comprising;
   reading a roller speed at step b).

6. The method of controlling the normal force in a CVU of continuously variable traction drive defined in claim 4 further comprising;
   reading a roller speed at step b).; and
   at step g). using the input speed, output speed and roller speed to calculate the slip.

* * * * *